March 25, 1969   A. B. BOWER, JR   3,434,552
SELF-CENTERING CUTTER BIT FOR DRILLS
Filed March 8, 1967   Sheet 1 of 2

INVENTOR
ARNOLD B. BOWER, JR.
BY *Harold J. Holt*
ATTORNEY

INVENTOR
ARNOLD B. BOWER, JR.
BY *Harold J. Holt*
ATTORNEY

United States Patent Office 3,434,552
Patented Mar. 25, 1969

3,434,552
SELF-CENTERING CUTTER BIT FOR DRILLS
Arnold B. Bower, Jr., St. Clair Shores, Mich., assignor to General Electric Company, a corporation of New York
Filed Mar. 8, 1967, Ser. No. 621,619
Int. Cl. E21c *13/01*
U.S. Cl. 175—410                           4 Claims

ABSTRACT OF THE DISCLOSURE

A self-centering cutter bit for drills, useful in drilling mine roof bolt holes, comprising a cutter bit having its head provided with an open, transverse slot which loosely receives a removable, plate-like cutter insert, the insert being loosely fastened by a pin extending through an oversized hole formed in the insert to permit limited endwise movement of the insert, wherein the insert self-centers relative to the axis of the cutter bit during drilling.

Background of the invention

Cutter bits for drills, used in drilling holes in rock in the roofs of mines for receiving blasting charges and for installing roof bolts, have been made in the form of a shank having an integral enlarged head to which has been fastened a cutter insert. These inserts have been made of hard, wear-resistant material, such as tungsten carbide and the like. Such inserts have always been rigidly fastened to the head, usually by means of brazing, in order to form a strong, rigid, unitary bit construction.

In use, such bits have had their shanks fastened to drill rods, in turn powered for rotation, with such rods frequently being formed in a hollow tube shape through which dust may be collected by means of vacuum pumping and also through which coolant fluids may be applied to both cool the bit as well as to remove dust.

An example of such a construction is shown in Bower U.S. Patent 3,187,825, issued on June 8, 1965.

Because of manufacturing inaccuracies, such drill bits have always tended to wobble during the drilling operation, resulting in oversized holes as well as excessive wear upon their cutter inserts. Attempts to reduce wobbling have always been in the direction of improving manufacturing tolerances, accuracies of fits, and better permanent securement techniques for fastening, as by brazing such inserts upon the heads. Nevertheless, the problem of wobbling still has not been solved until this present invention.

Summary of the invention

I have discovered that wobbling can be eliminated or considerably reduced by means of loosely fastening a cutter insert to a tool bit head, so that it may move to a limited extent and thus center itself during the drilling operation. After a few feet of drilling in rock or the like, the drill dust tends to tightly pack around the insert, between the insert and its connection to the head, thereby tightly clamping the insert against further looseness or relative movement after it has become centered. Such drill dust pack also provides a shock-absorbing layer between the insert and slot to protect the brittle insert against breakage. At the same time, the insert may be easily removed and replaced when worn, so that the cutter bit head may be used for considerably longer periods of time, merely by replacing worn inserts.

Hence, it is an object of this invention to provide a cutter bit with a slightly oversized insert-receiving slot within which an insert is loosely arranged and held by means of the relatively loose fastener, wherein the insert may move to a limited extent to thereby center itself along both the bit axis and the axis of the drill rod during drilling.

Another object of this invention is to fasten an insert loosely within an insert-receiving slot in the cutter head by means of a releasable fastener so that the insert may be replaced when worn, thereby extending the life of the cutter head.

Brief description of the drawings

These and other objects and advantages of this invention will become apparent upon reading the following description, of which the attached drawings form a part.

In these drawings.

Description of the preferred embodiments

Figure 1:
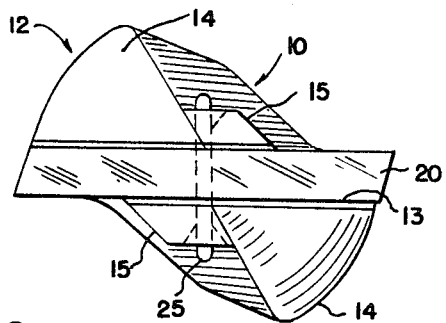
FIGURE 1 is a plan view of the cutter bit herein.
Figure 2:
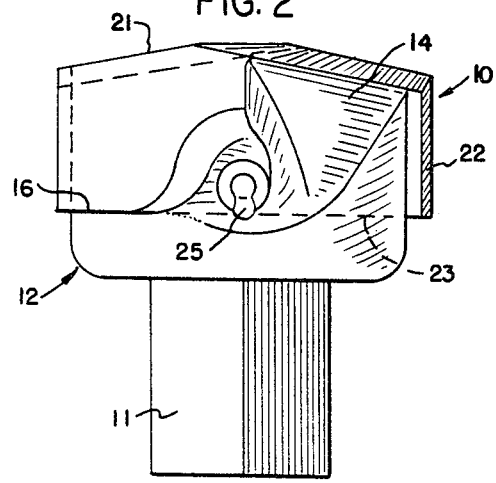
FIGURE 2 is an elevational view of the cutter bit.

Referring to FIGS. 1–6, the cutter bit 10 comprises a shank 11, shaped to engage with and connect to a powered drill rod, and a head 12. The head 12 is provided at its free end with a transversely arranged open slot 13, defined by opposing head side portions 14 having integral bosses 15 and a slot base 16. Aligned holes 17 are formed in the bosses, with the axis of alignment of the holes preferably intersecting the bit axis.

Fitted into the slot 13 is a cutter insert 20 generally formed as an elongated, rectangular-shaped plate having a top cutting edge 21, side cutting edges 22, and a base 23 for resting upon the base 16 of the slot.

A hole 24 is formed through the center lower edge of the insert for alignment with the holes 17 in the drill bit head.

A suitable pin, such as a wire 25, extends through the three aligned holes 17 and 24 to secure the insert to the head.

Figure 3:
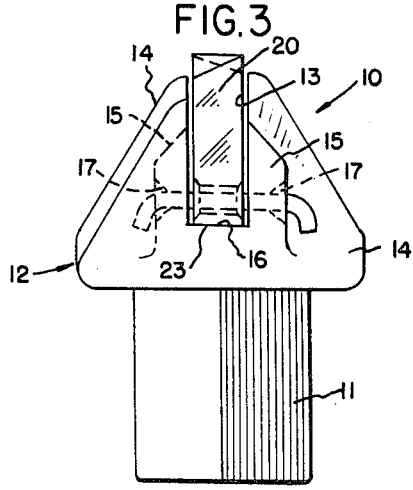
FIGURE 3 is a side elevational view thereof.
Figure 4:
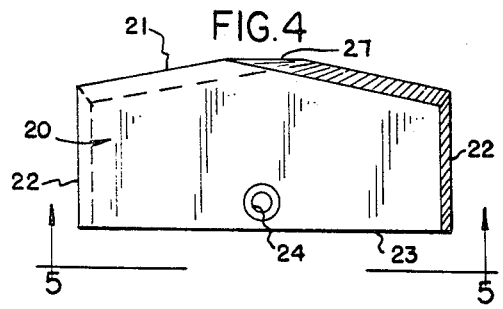
FIGURE 4 is an elevational view of the insert per se.
Figure 5:
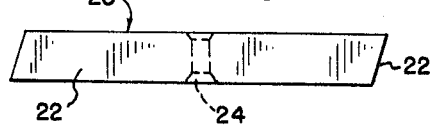
FIGURE 5 is a bottom view of the insert, taken in the direction of arrows 5—5 of FIG. 4.
Figure 6:
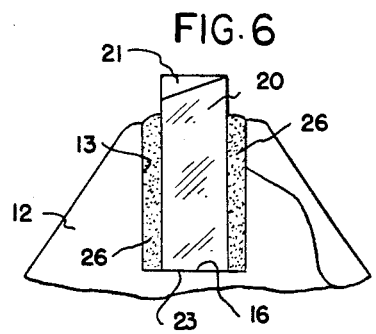
FIGURE 6 is an enlarged fragmentary side view showing dust packed between the insert and walls of its receiving slot.

The width of the slot is slightly greater than the thickness of the insert, such as a few thousandths of an inch up to approximately thirty thousandths of an inch, although the difference is by no means critical, as indicated in an exaggerated fashion in FIGS. 1, 3 and 6, so that the insert is loosely held within the slot for free endwise sliding movement relatively to the slot. Likewise, the hole 24 formed through the insert is considerably oversized relative to the diameter of the fastening pin, which thereby functions not only to hold the insert in place, but also to permit limited movement of the insert relative to the head. In this manner, the insert is free to move endwise relative to the head, but only to a limited extent, as for example approximately .030 of an inch. This loose connection contrasts with the conventional method of permanently fixing the insert to the head as by means of brazing or the like to form a rigid connection. It is important that the hole 24 be relatively close to the apex 27 of the insert to eliminate, to as great an extent as possible, movement in slot 13 in a direction other than transverse.

In operation, the cutter bit is secured to the end of the drill rod which is powered for rotation, and as the cutter bit is applied against rock and the like, the insert moves sufficiently to self-center along both the cutter and drill rod axes, thereby substantially reducing or even eliminating wobble and the resultant oversized holes and wear upon the insert. Alternatively, the drill rod may itself be slotted to receive the insert and thereby act as the head of the bit, eliminating the need for a shank. The drill rod may therefore serve as the cutter bit. The cutter bits of the invention thereby produce holes of a diameter more closely approximating the diameter of the insert than has heretofore been possible.

After a short time, as for example a foot or two of drilling, the rock dust formed during drilling tightly packs into the space between the insert and slot walls to form a cushioning pack 26 (see FIG. 6) which clamps the insert against further movement relative to the head and cushions it against shocks which might otherwise fracture the brittle carbide.

The cutter bit is used for drilling until such time as the insert is excessively worn. At that point, the cutter bit is removed from the hole, the pin 25 is removed and the worn insert is removed and replaced with a new, sharpened insert.

Since the insert is disposable upon becoming worn, without the need for resharpening it, and since it need not be of a sufficiently large size to permit brazing, its height may be considerably reduced compared with conventional inserts. This results in reducing the cost of the insert, which is typically made of expensive tungsten carbide or similar carbide materials, and more importantly, lowers the cutting edge closer towards the shank so that drill dust may be more readily removed by standard vacuum removal procedures, and the cutting edge may be more easily cooled where coolant fluids are utilized.

Figure 7:
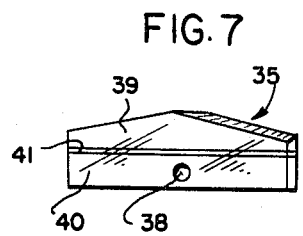
FIGURE 7 is a view of an alternate insert design.

Referring to FIG. 7, the insert 35 is made of two parts, namely, an upper tungsten carbide, or other wear-resistant material portion 39, and a lower non-brittle metal portion 40, such as steel strip, the two parts being joined together by braze 41 or other suitable permanent fastening. With this form of insert, the brittle carbide is reinforced and protected by the steel lower portion and is further cushioned by the braze therebetween. In addition, the hole 38 is formed in the lower steel portion, thereby avoiding the possibility of weakening the already brittle carbide. This results in an insert with possibly greater overall strength and resistance to fracturing due to sudden shocks and impacts. In addition, it is considerably more economical to form a hole in steel than a hard material such as carbide.

Figure 8:
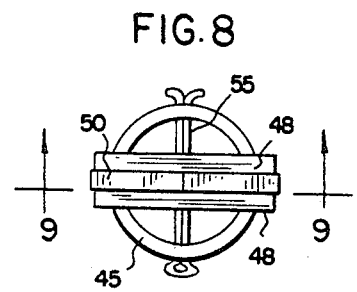
FIGURE 8 is a top plan view of another modified cutter bit.
Figure 9:
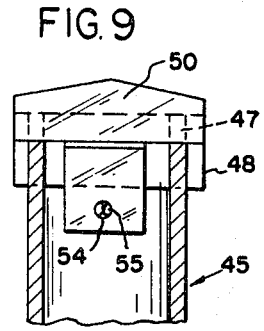
FIGURE 9 is a cross-sectional view taken in the direction of arrows 12—12 of FIG. 8.
Figure 10:
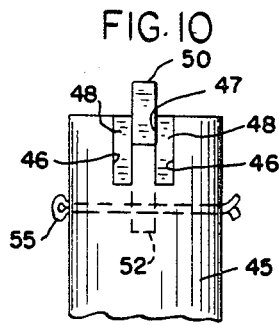
FIGURE 10 is a side elevational view of the cutter bit of FIGS. 8 and 9.

FIGS. 8-10 show a further modification wherein the bit is made out of a tube 45 having opposed pairs of slots 48 between which is formed a slot 47 at its upper end. Hard, wear-resistant plates 48 fit within the slots 47 and are permanently secured there, as by brazing. These plates form the insert-receiving slot between them, so that the insert 50 may be dropped down into the slot 47 and loosely positioned between the plates 48.

Figure 11:
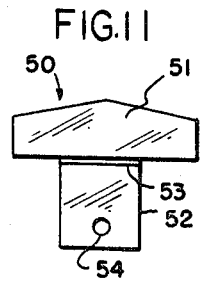
FIGURE 11 shows the cutter bit of FIGS. 8–10.

As shown in FIG. 11, the insert is T-shaped, preferably with the upper portion 51 formed of the conventional carbide and the lower portion 52 formed of steel or the like shock-resistant, strong material, the two portions being permanently fastened together, as by brazing 53. An opening 54 is formed in the lower portion 52 so that the insert is secured to the tube 45 by means of a cotter pin 55 or the like, extending through aligned holes in the tube and through the opening 54 in the insert.

I claim:
1. In a cutter bit for roof drills comprising:
   a head and a shank with a single open top, open-sided slot formed in and extending transversely of the head for closely receiving a single substantially flat, plate-like cutter insert rested upon the bottom of the slot, with the free edge of the insert extending ouwardly of said slot, the apex of said free edge being located along the axis of rotation of said bit, the improvement comprising
   said slot, being slightly thicker than the cutter insert, wherein the insert is freely slidably movable along the length of the slot, that is, transversely of the head,
   releasable fastener means securing the insert to the head and limiting the movement of the insert to a relatively small amount,
   wherein said insert is self-centering relative to the axis of rotation of the bit during drilling.

2. In a cutter bit as defined in claim 1, said fastening means comprising aligned holes formed in the head transversely of and opening into the slot, a hole formed through the insert, and a removable pin extending through said holes, with the diameter of the hole in the insert being larger than that of the pin.

3. In a cutter bit as defined in claim 2, said insert comprising an upper cutter part formed of a hard carbide material and a lower support part formed of a relatively softer material, such as steel, permanently joined edge-to-edge with the upper part,
   said hole formed through the insert being formed in said lower support part.

4. A construction as defined in claim 3, said support portion extending along and being continuously secured along the full length of the edge of the carbide portion.

References Cited

UNITED STATES PATENTS

| | | | |
|---|---|---|---|
| 1,899,458 | 2/1933 | Erickson | 175—410 X |
| 2,022,194 | 11/1935 | Galvin | 175—410 X |
| 2,030,576 | 2/1936 | Erickson | 175—410 X |
| 2,166,478 | 7/1939 | Riblet | 175—410 |
| 2,575,239 | 11/1951 | Stevens | 175—418 X |
| 2,842,342 | 7/1958 | Haglund | 175—410 |
| 3,032,129 | 5/1962 | Fletcher et al. | 175—410 X |
| 3,089,552 | 5/1963 | Black et al. | 175—410 X |

FOREIGN PATENTS

| | | |
|---|---|---|
| 634,743 | 3/1950 | Great Britain. |

CHARLES E. O'CONNELL, *Primary Examiner.*

RICHARD E. FAVREAU, *Assistant Examiner.*